(12) United States Patent
Paulraj et al.

(10) Patent No.: US 12,455,732 B2
(45) Date of Patent: Oct. 28, 2025

(54) SYSTEMS AND METHODS FOR TOPOLOGY AWARE FIRMWARE UPDATES

(71) Applicant: Dell Products, L.P., Round Rock, TX (US)

(72) Inventors: Deepaganesh Paulraj, Bangalore (IN); Rama Rao Bisa, Bangalore (IN); Naveen Karthick Chandrasekaran, Bangalore (IN); Manjunath Am, Bangalore (IN); Pavan Kumar Gavvala, Bangalore (IN); Abhishek Ramachandra Manganawar, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/935,584

(22) Filed: Sep. 27, 2022

(65) Prior Publication Data

US 2024/0103835 A1    Mar. 28, 2024

(51) Int. Cl.
G06F 9/44    (2018.01)
G06F 8/65    (2018.01)
G06F 9/48    (2006.01)
G06F 13/40   (2006.01)

(52) U.S. Cl.
CPC .............. *G06F 8/65* (2013.01); *G06F 9/4881* (2013.01); *G06F 13/4081* (2013.01)

(58) Field of Classification Search
None
See application file for complete search history.

(56) References Cited

U.S. PATENT DOCUMENTS

| | | | |
|---|---|---|---|
| 10,740,089 B1* | 8/2020 | Singh | G06F 8/654 |
| 2014/0089912 A1* | 3/2014 | Wang | G06F 8/65 |
| | | | 717/173 |
| 2020/0218527 A1* | 7/2020 | Ganesan | G06F 8/65 |
| 2021/0271625 A1* | 9/2021 | Krishnapillai | G06F 13/4282 |
| 2021/0286608 A1* | 9/2021 | Narasimhan | G06F 8/654 |
| 2022/0291917 A1* | 9/2022 | Nielsen | G06F 8/65 |
| 2023/0266963 A1* | 8/2023 | Han | G06F 8/65 |
| | | | 717/168 |
| 2023/0393841 A1* | 12/2023 | Wang | G06F 8/654 |

* cited by examiner

*Primary Examiner* — Insun Kang
(74) *Attorney, Agent, or Firm* — Fogarty LLP

(57) ABSTRACT

Embodiments of systems and methods to provide a firmware update to multiple storage units configured with different interfaces in an Information Handling System (IHS) are disclosed. In an illustrative, non-limiting embodiment, an IHS may include computer-executable instructions to receive a firmware update image associated with the storage units, and for each of the storage units, identify an update profile based on the type of interface associated with the storage unit, the interface configured to provide communication between the storage unit and the IHS, and perform a firmware update on the storage unit according to the update profile.

20 Claims, 6 Drawing Sheets

SYSTEMS AND METHODS FOR TOPOLOGY AWARE FIRMWARE UPDATES

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

Nowadays, software updates are typically made available on one or more download sites as soon as the software provider can produce them. In this manner, software providers can be more responsive to critical flaws, security concerns, and general customer needs. As a result, to update software, a customer would query an update site for software updates, and download and install the software update if available. For example, a typical network-based software update procedure may include the steps of issuing a request over a network to a software provider's download site (e.g., update source) for a software update applicable to the client computer. The update source responds to the client computer with the software update requested by the client computer in the update request. After the client computer has received the software update, the client computer installs the received software update.

One benefit of updating software in such a manner is the reduced cost associated with producing and distributing software updates. Additionally, software updates can now be performed more frequently, especially those that address critical issues and security. Still further, a computer user has greater control as to when and which software updates should be installed on the client computer.

SUMMARY

Embodiments of systems and methods to provide a firmware update to multiple storage units configured with different interfaces in an Information Handling System (IHS) are disclosed. In an illustrative, non-limiting embodiment, an IHS may include computer-executable instructions to receive a firmware update image associated with the storage units, and for each of the storage units, identify an update profile based on the type of interface associated with the storage unit, the interface configured to provide communication between the storage unit and the IHS, and perform a firmware update on the storage unit according to the update profile.

According to another embodiment, a topology aware firmware update method includes the steps of receiving a firmware update image associated with a plurality of storage units, and for each of the storage units, identifying an update profile based on the type of interface associated with the storage unit, and performing a firmware update on the storage unit according to the update profile. The interface is configured to provide communication between the storage unit and the HIS.

According to yet another embodiment, a memory storage device is configured with program instructions stored thereon that, upon execution by a client Information Handling System (IHS), cause the client IHS to receive a firmware update image associated with a plurality of storage units, and for each of the storage units, identify an update profile based on the type of interface associated with the storage unit, and perform a firmware update on the storage unit according to the update profile.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
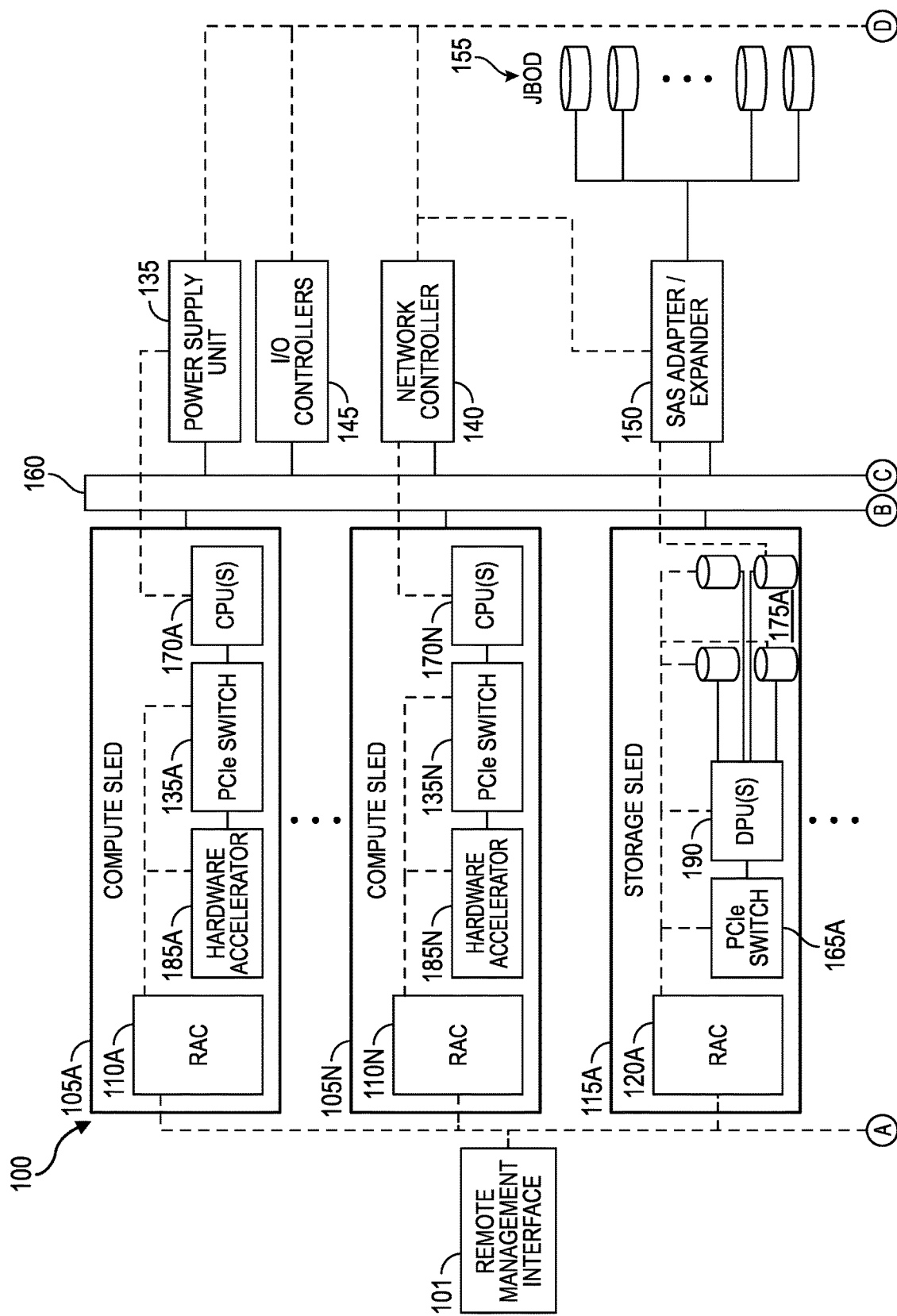
FIGS. 1A and 1B illustrate certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Firmware updates of server components is an important aspect of the life cycle management of a server. Traditional means of updating server components have involved migrating the workloads running on the host Operating System (OS), creating a reboot job, rebooting the server, and performing the firmware update. Additionally, the server is again rebooted to activate the new firmware on the server components. This process is not very customer friendly as the server is required to be down for the firmware update process, thus impacting business. Because servers are forced to reboot to perform the firmware updates, customers wait for its maintenance cycle to update the server components, thus missing the new firmware features, security fixes, performance improvements, and the like. As such, rebootless updates may be an important aspect of efficient computer operations. Using rebootless updates, users may be enabled with performing the updates without rebooting the servers and get more useful features above what today's industry specifications can provide.

Customers often upgrade the firmware in the IHSs of a data center for assorted reasons, such as to meet compliance policies, to take advantage of new features, enhancements to the IHS, deploy security fixes, and the like. The IHSs that are NVMe-MI/PLDM Specification compliant can take advantage of updating firmware to all IHSs in a system or in a cluster without rebooting the servers. The devices which support Platform Level Data Model (PLDM) offers an option for the Remote Access Controller (RAC) to update the firmware without rebooting the HOST server. Thus, downtime is often not incurred during the firmware update process.

In many cases, the firmware update process may be performed by a RAC. The RAC may be configured to provide out-of-band management facilities for the IHS 100, even if IHS is powered off, or powered down to a standby state. The RAC may include a processor, memory, and an out-of-band network interface separate from and physically isolated from an in-band network interface of the IHS, and/or other embedded resources. In certain embodiments, the RAC may include or may be part of a Remote Access Controller (e.g., a DELL Remote Access Controller (DRAC) or an Integrated DRAC (iDRAC)). The RAC may support rebootless firmware updates for NVMe storage devices that are CPU attached NVMe SSDs, as well as through Boot Optimized Storage Solution (BOSS), Non-Volatile Memory Host Controller Interface Specification Express (NVMe), Power Edge RAID Controller (PERC), Host Bus Adapter (HBA), Just a Bunch of Disk (JBOD), and/or NVMe SSDs over Fabric NVMeOF interfaces. In order to update the firmware to all these differently connected NVMe SSDs, one may be required to run update commands multiple times to each NVMe SSD with a different firmware update profile (FUP).

For example, to update a NVMe storage unit through a PERC interface may, one may use a PLDM based rebootless update using a Firmware Device Proxy (FDP) feature, while a NVMeOF storage unit may be updated using a NCSI based or NVMeoF based firmware update. Different update profiles may be required to update the same type of storage unit depending on the how the NVMe SSDs are interconnected with the IHS. As such, multiple reboot sequences may be required after each update profile is performed. As will be described in detail herein below, embodiments of the present disclosure provide systems and methods for topology aware firmware updates in which each of multiple storage units are identified according to an update profile based on the type of interface associated with the storage unit, and perform a firmware update on the storage unit according to the update profile.

Figure 1B:
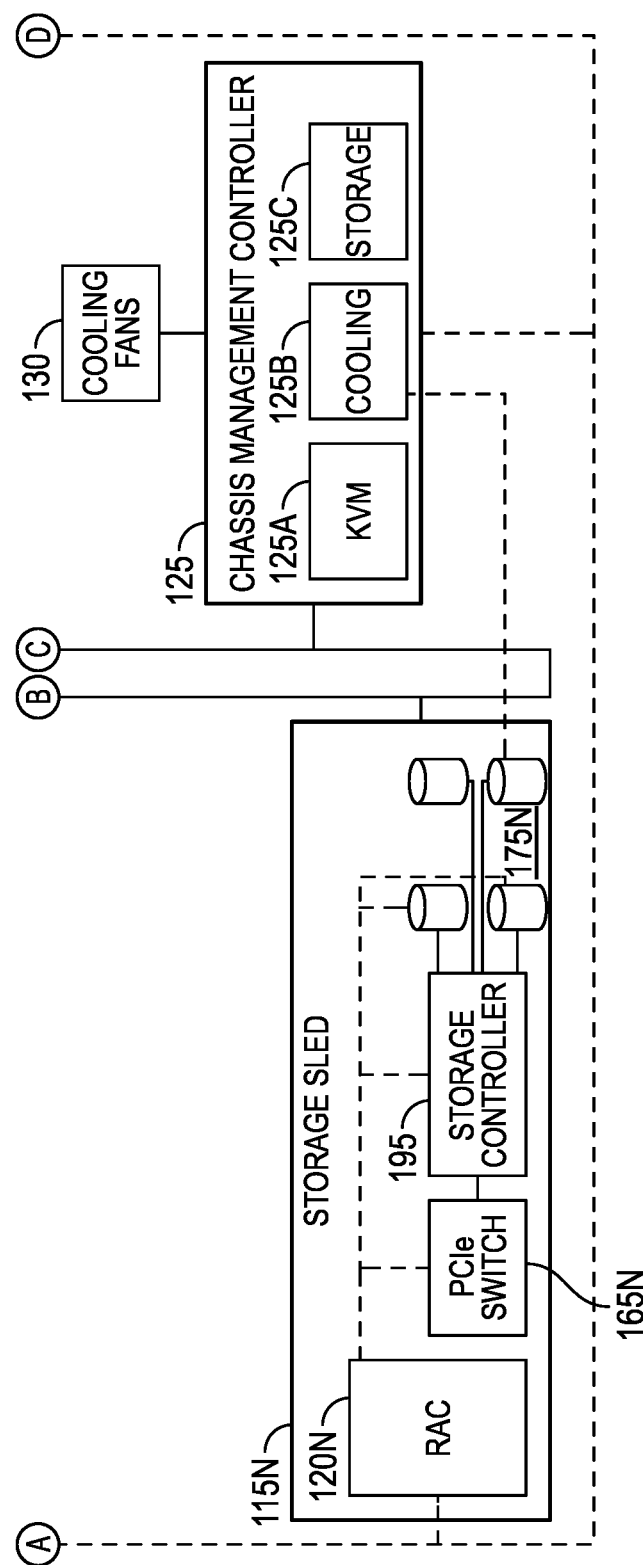

FIGS. 1A and 1B illustrate certain components of a chassis 100 comprising one or more compute sleds 105a-n and one or more storage sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185*a-n* that may include one or more programmable processors that operate separate from the main CPUs 170*a-n* of computing sleds 105*a-n*. In various embodiments, such hardware accelerators 185*a-n* may include DPUs (Data Processing Units), GPUs (Graphics Processing Units), SmartNICs (Smart Network Interface Card) and/or FPGAs (Field Programmable Gate Arrays). These hardware accelerators 185*a-n* operate according to firmware instructions that may be occasionally updated, such as to adapt the capabilities of the respective hardware accelerators 185*a-n* to specific computing tasks.

Chassis 100 may be installed within a rack structure that provides at least a portion of the cooling utilized by the sleds 105*a-n*, 115*a-n* installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans 130 to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105*a-n*, 115*a-n* to backplane 160 include PCIe couplings that support high-speed data links with the sleds 105*a-n*, 115*a-n*. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
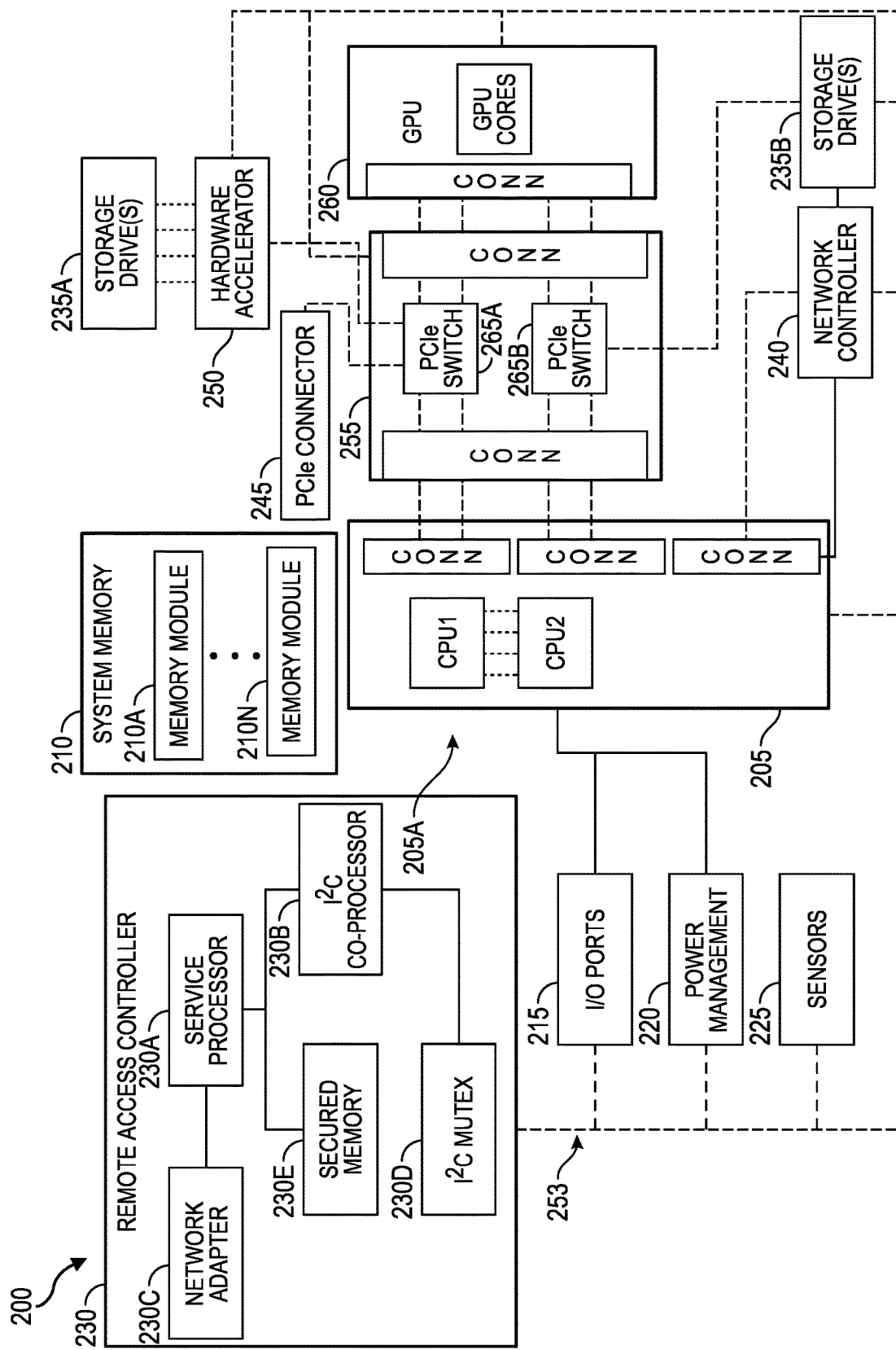
FIG. 2 illustrates an example of an IHS configured to implement systems and methods described herein according to one embodiment of the present disclosure.

In certain embodiments, each individual sled 105*a-n*, 115*a-n-n* may be an IHS such as described with regard to IHS 200 of FIG. 2. Sleds 105*a-n*, 115*a-n* may individually or collectively provide computational processing resources that may be used to support a variety of e-commerce, multimedia, business, and scientific computing applications, such as artificial intelligence systems provided via cloud computing implementations. Sleds 105*a-n*, 115*a-n* are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105*a-n*, 115*a-n* be likewise made without having to reboot the respective sled of the hardware component that is being updated.

As illustrated, each sled 105*a-n*, 115*a-n* includes a respective remote access controller (RAC) 110*a-n*, 120*a-n*. As described in additional detail with regard to FIG. 2, remote access controller 110*a-n*, 120*a-n* provides capabilities for remote monitoring and management of a respective sled 105*a-n*, 115*a-n* and/or of chassis 100. In support of these monitoring and management functions, remote access controllers 110*a-n* may utilize both in-band and sideband (i.e., out-of-band) communications with various managed components of a respective sled 105*a-n* and chassis 100. Remote access controllers 110*a-n*, 120*a-n* may collect diverse types of sensor data, such as collecting temperature sensor readings that are used in support of airflow cooling of the chassis 100 and the sleds 105*a-n*, 115*a-n*. In addition, each remote access controller 110*a-n*, 120*a-n* may implement various monitoring and administrative functions related to a respective sled 105*a-n*, 115*a-n*, where these functions may be implemented using sideband bus connections with various internal components of the chassis 100 and of the respective sleds 105*a-n*, 115*a-n*. As described in additional detail below, in various embodiments, these capabilities of the remote access controllers 110*a-n*, 120*a-n* may be utilized in updating the firmware of hardware components of chassis 100 and/or of hardware components of the sleds 105*a-n*, 115*a-n*, without having to reboot the chassis or any of the sleds 105*a-n*, 115*a-n*.

The remote access controllers 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175*a-n* installed in a chassis 100, or to all of the storage drives 175*a-n* of a particular model or manufacturer. In some instances, remote management interface 101 may include an inventory of the hardware, software, and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110*a-n*, 120*a-n*. In some embodiments, remote management interface 101 may communicate with remote access controllers 110*a-n*, 120*a-n* via a protocol such the Redfish remote management interface.

In the illustrated embodiment, chassis 100 includes one or more compute sleds 105*a-n* that are coupled to the backplane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105*a-n* includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage drives 155 may be accessed via a SAS expander 150 that is coupled to the backplane 160 of the chassis 100. The SAS expander 150 may support connections to a number of JBOD (Just a Bunch of Disks) storage drives 155 that, in some instances, may be configured and managed individually and without implementing data redundancy across the various drives 155. The additional storage drives 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 require the updates to be applied within each of these topologies being supported by the chassis 100. Despite the substantial number of different storage drive topologies that may be supported by an individual chassis 100, the firmware used by each of these storage devices 175a-n, 155 may be occasionally updated. In some instances, firmware updates may be limited to a single storage drive, but in other instance, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n, or other type of server, such as an 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with storage drives 235a, thus supporting high-bandwidth connections with the storage drives. Hardware accelerator 250 may also include one or more memory devices used to store program instructions executed by the processing cores and/or used to support the operation of storage drives 235a such as in implementing cache memories and buffers utilized in support of high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 253 is illustrated as single line in FIG. 2. However, sideband bus 253 may be comprises of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
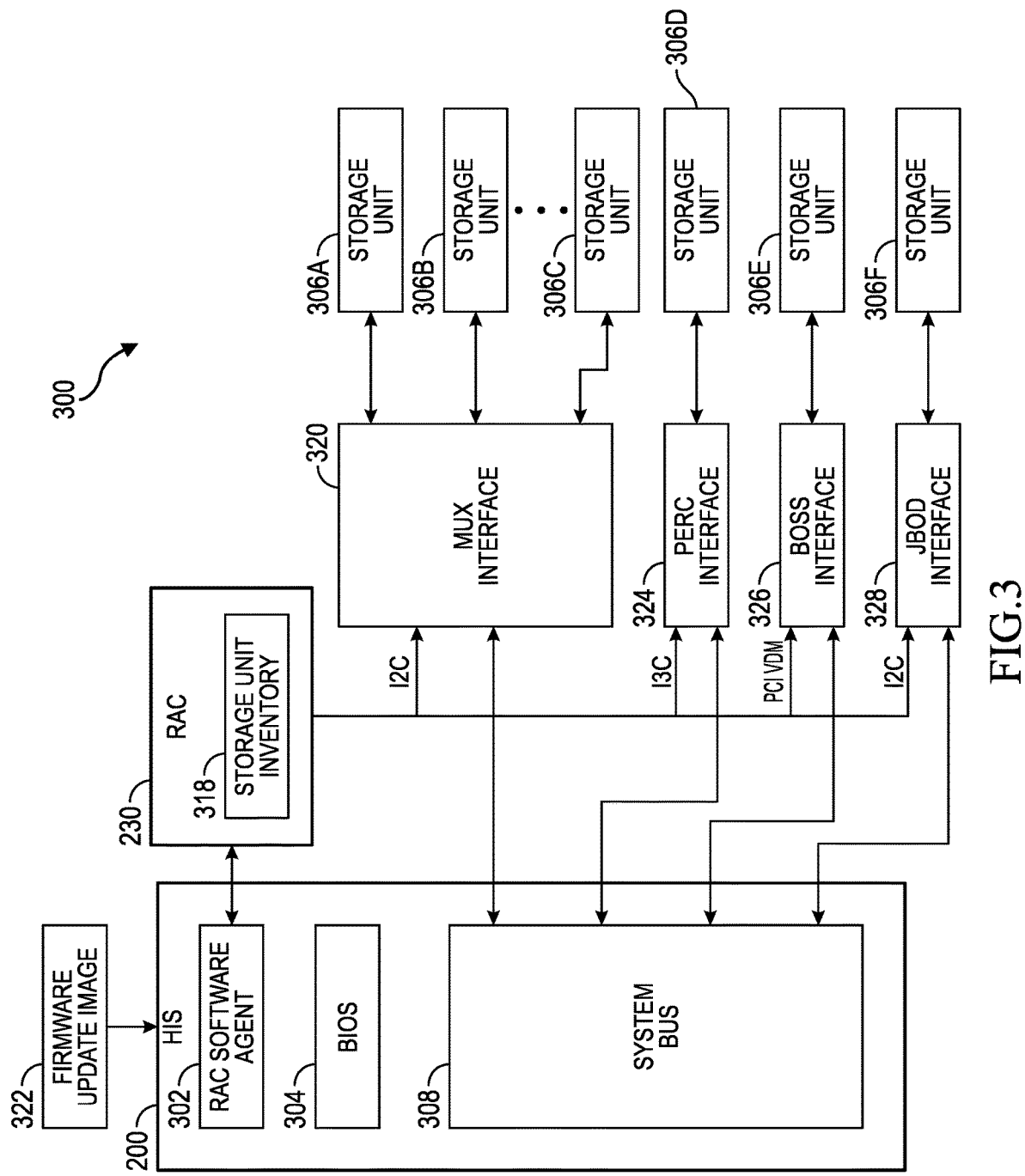
FIG. 3 is a diagram illustrating several components of an example associated IHS showing how those components may communicate with one another for implementing a topology aware firmware update system according to one embodiment of the present disclosure.

FIG. 3 is a diagram 300 illustrating several components of an example associated IHS 200 showing how those components may communicate with one another for implementing a topology aware firmware update system 300 according to one embodiment of the present disclosure. The IHS 200 is shown with a RAC software agent 302, a basic input output system (BIOS) 304, and a system bus 308. The system bus 308 is coupled to a number of storage units 306a-f (collectively 306) through either a multiplex (MUX) interface 320 (direct CPU), a PERC interface 324, a boss interface 326, or a JBOD interface 328. It should be appreciated that the system 300 may also function with other types of interfaces without departing from the spirit and scope of the present disclosure.

Each storage unit 306 may be any IHS configurable device that stores data, such as an NVMe storage unit, a Half Height, Half Length (HHHL) storage unit, a Full Height, Half Length (FHHL) storage unit, an NVMe Solid State Drive (SSD), a NVMe SSD (version M.2) and so on. For example, the storage units 306 may include a storage drive 235b, those that are configured on a storage sled 115a-n, and/or storage drives 155 configured in a JBOD, such as described herein above with reference to FIGS. 1 and 2. Some, most, or all storage units 306 communicate with the IHS 200 via system bus 308, which in one embodiment, may include a Peripheral Component Interconnect Express (PCIe) bus. Additionally, each storage unit 306 may communicate with its respective interface 322-328 using any suitable connection, such as an i2c connection, an I3C SENSEWIRE connection, a serial peripheral interface (SR) based connection, and/or a Management Component Transport Protocol (MCTP) PCIe vendor defined message (VDM) channel.

A RAC 230 is provided to manage topology aware firmware updates to the storage units 306. While the present disclosure describes a RAC for managing the firmware updates, it should be appreciated that in other embodiments, the CPU 205, GPU 260, and/or Chassis Management Controller 125 may be configured to perform such tasks without departing from the spirit and scope of the present disclosure. The RAC 230 communicates with the IHS 200 via a RAC software agent 302. The RAC software agent 302 is a lightweight software service that is executed on the host IHS 200 to integrate certain operating system (OS) features with the RAC 230. The RAC software agent 302 provides OS-related information to the RAC 230, and may add capabilities such as LC log event replication into the OS log, WMI support (including storage), RAC SNMP alerts via OS, RAC hard reset and remote full Power Cycle. For example, the RAC software agent 302 may be an iDRAC Service Module (iSM) that is configured to operate with the integrated Dell remote access controller (iDRAC), which are both provided by DELL TECHNOLOGIES.

The IHS 200 may receive a firmware update image 322 that is to be installed on one or more storage units 306. Nevertheless, the firmware update image 322 may require a different update profile based upon the interface 320, 324, 326, or 328 that the storage unit 306 is coupled to. Within this disclosure, an update profile generally refers to a sequence and type of operations (e.g., PLDM proxy update, NVMe-MI based update, etc.) that may be performed for the purpose of updating the firmware of the storage unit 306. The RAC 230 manages a rebootless firmware update for some, most, or all supported NVMe devices. The RAC 230 obtains details associated with the storage units 306 during initial power on (e.g., boot process), and/or when a storage unit 306 is hot-plugged to the IHS 200 to populate a storage unit inventory 318 with information about each storage unit 306 and the interface 322-328 associated with that storage unit 306. Later on when a user (e.g., IHS administrator) uploads the firmware update image 322, the RAC 230 searches through storage unit inventory 318 to identify those storage units 306 that are applicable to the firmware update image 322, and displays the applicable storage units 306 as a list for view by the user. The RAC 230 may also receive user input to obtain a user selected list of storage units 306 that are to receive the firmware update image 322, and select an appropriate update profile to update the firmware of each user selected storage unit 306 without reboot. For example, the RAC 230 may start a PLDM proxy update for an NVMe SSD which is coupled to the PERC interface 324 and a NVMe-MI based update for an NVMe SSD storage unit 306 which is root port attached vi the MUX 322.

If any NVMe SSD firmware update needs a reboot to activate with new firmware, the RAC 230 may perform a NVMe sub-system reset or BPAPI based reset of NVMe SSD when there is relatively little read/write traffic going through the storage unit 306. In one embodiment, the RAC 230 may be configured to trigger the reset based on a specified level (e.g., less than 5%) of read/write traffic happening to the respective NVMe SSDs. In another embodiment, the specified level may be configurable by the user.

For storage units 306 that do not support PCIe VDM/NVMe-MI based Rebootless update, the RAC 230 may schedule a reboot job and update all the NVMe SSDs using conventional firmware updating techniques (e.g., Firmware Management Protocol (FMP)) or other suitable methods. Additionally, the device monitoring modules in the RAC 230 can register a callback to get the new firmware version notification such that the call back will be called after updating the firmware with the list of NVMe SSDs that are updated with new firmware.

Figure 4:
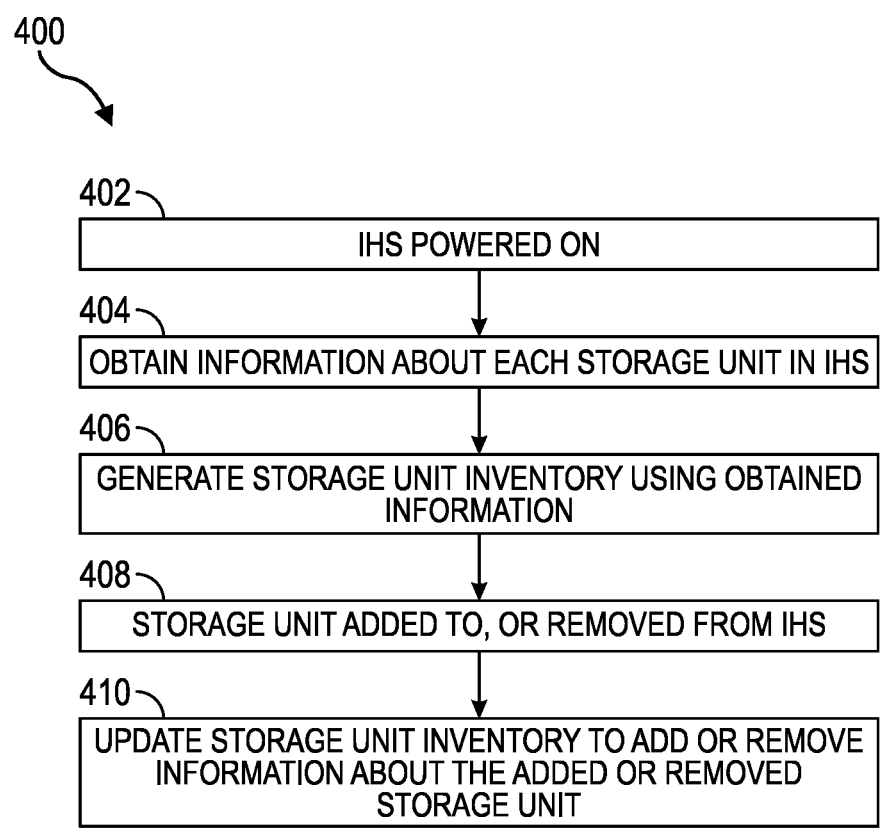
FIG. 4 illustrates a storage unit inventory generation method depicting how an IHS may maintain a record of storage units according to one embodiment of the present disclosure.

FIG. 4 illustrates a storage unit inventory generation method 400 depicting how an IHS 200 may maintain a record of storage units 306 according to one embodiment of the present disclosure. In one embodiment, the storage unit inventory generation method 400 may be performed in whole, or in part, by the storage unit inventory generation system 300 described herein above. In another embodiment, the method 400 may be performed at least in part, by the RAC 230.

Initially at step 402, the IHS 200 is powered on. The power on event may be the first time the IHS 200 is started following manufacture, or at any time the IHS 200 is re-booted. At step 404, the RAC 230 obtains information about each storage unit 306 in the IHS 200. The information may include the specific identifying information (e.g., GUID) about each storage unit 306 and the interface 322-328 that is used to couple it to the IHS 200. In one embodiment, the method 400 may obtain the storage unit information during a DXE phase of a UEFI boot process. In such a case, the method 400 may obtain at least a portion of the information from tables maintained by the UEFI boot process. In one embodiment, the method 400 may obtain the information using a BIOS discovery process.

At step 406, the method 400 generates and stores the storage unit inventory 318 using the obtained information. At this point, the IHS 200 is used in the normal manner in which the storage units 306 are actively being used. At some later point in time at step 408, a storage unit 306 is added to (e.g., hot-plugged), or removed (e.g., hot-removed) from the IHS 200. In response, the method 400 updates the storage unit inventory 318 to add or remove information about the added or removed storage unit 306 at step 410.

Thus as shown above, the method 400 may continually update the storage unit inventory 318 to maintain an accurate record of some, most, or all storage units 306 configured in the IHS 200. Additionally, the method 400 may be performed at any suitable time, such as each time the IHS 200 is re-booted.

Figure 5:
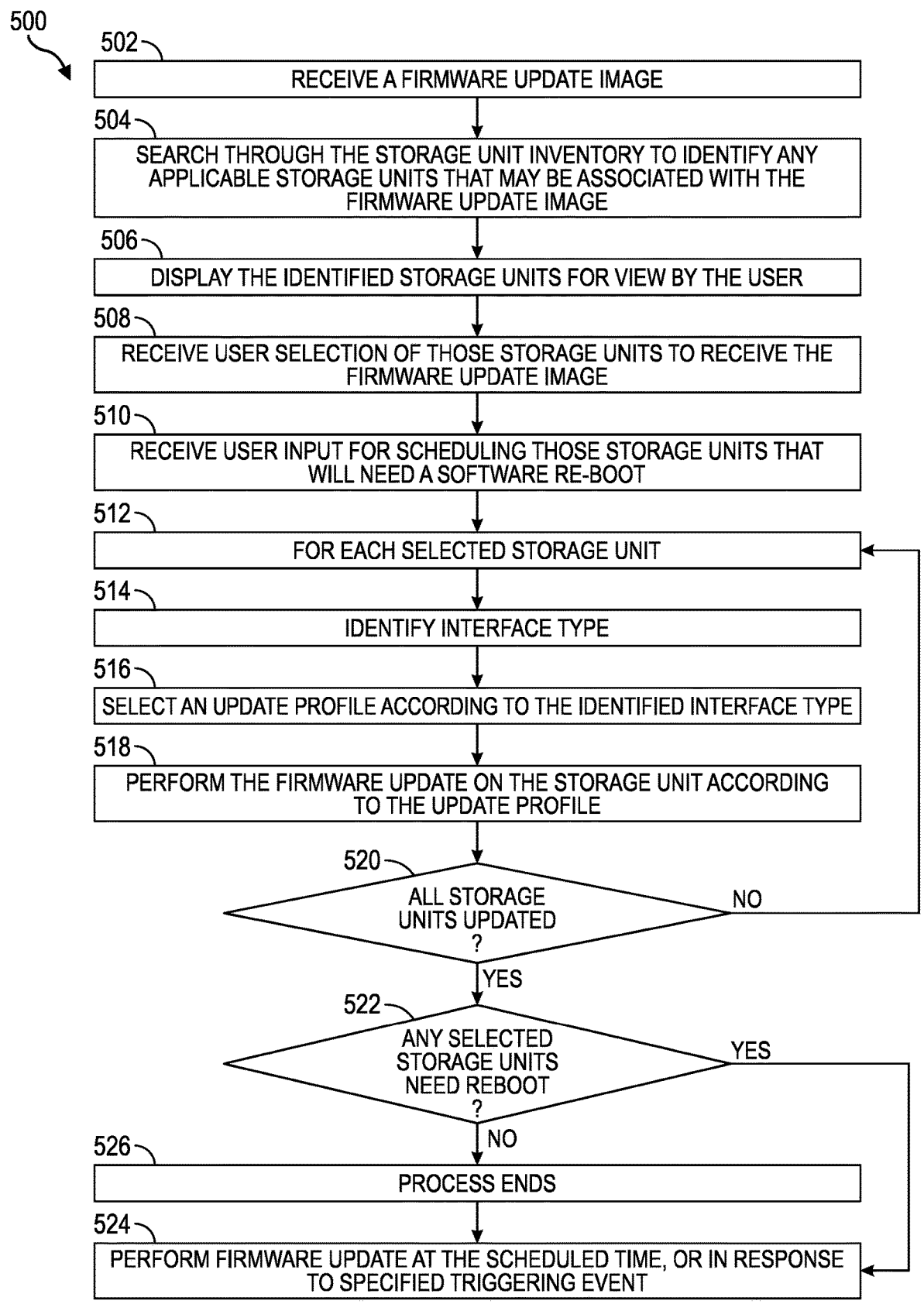
FIG. 5 illustrates a storage unit firmware update method depicting how the storage units of the IHS may receive a firmware update according to one embodiment of the present disclosure.

FIG. 5 illustrates a storage unit firmware update method 500 depicting how the storage units 306 of the IHS 200 may receive a firmware update according to one embodiment of the present disclosure. In one embodiment, the storage unit firmware update method 500 may be performed in whole, or in part, by the storage unit inventory generation system 300 described herein above. In another embodiment, the method 500 may be performed at least in part, by the RAC 230. In one embodiment, the storage unit firmware update method 500 may be performed after the storage unit inventory generation method 400 is performed in which the storage unit inventory 318 has been generated and is available for use. Initially, a firmware update image 322 (e.g., a new software package or an updated version of an existing software package) is promoted or made available by a provider of the storage units 306 that the firmware update image 322 supports.

At step 502, the method 500 receive the receives the firmware update image 322. In response, the method 500 searches through the storage unit inventory 318 to identify any applicable storage units 306 that may be associated with the firmware update image 322 at step 504. For example, the RAC 230 may identify a particular make, model, and version of storage unit 306 that the firmware update image 322 pertains to, and search through the storage unit inventory 318 for any storage unit 306 that matches the identified make, model, and version.

The method 500, at step 506, may then display the identified storage units 306 for view by the user. For example, the method 500 may display a list of the identified storage units 306 on the remote management interface 101 as described above with reference to FIG. 1. The method 500 then receives user selection of those storage units 306 to receive the firmware update image 322 at step 508. For example, the method 500 may receive mouse clicks over one or more displayed rows of the list to indicate which storage units 306 the user desires to perform the firmware update on, and in response, highlight those rows on the remote management interface 101.

At step 510, the method 500 may optionally receive user input for scheduling those storage units that will need a software re-boot. For example, the method 500 may receive user input associated with a date and time (e.g., nightly maintenance window) in which the firmware update is to be performed. At this point, the method 500 has processed received firmware update image 322, received user input for selecting which storage units 306 are to be updated, and is ready to update the selected storage units 306.

At step 512, the method 500 performs steps 514-526 for each selected storage unit 306. The method 500 identifies an interface type (e.g., Direct Connect (MUX), PERC, BOSS, JBOD, NVMeOF, etc.) associated with the storage unit 306 at step 514, and selects an update profile according to the identified interface type at step 516. Thereafter at step 518, the method 500 performs the firmware update on the storage unit according to the update profile.

At step 520, the method 500 determines whether all storage units 306 have been updated. If not, processing continues at step 512 to perform a firmware update on the next storage unit 306; otherwise, processing continues at step 522. At step 522, the method 500 determines whether any of the selected storage units need a reboot. If so, processing continues at step 524 to perform the firmware update at the scheduled time, or in response to specified triggering event using user input that was received at step 510. If, however, the method 500 determines that no storage units 306 require a reboot, processing continues at step 526 in which the method 500 ends.

The aforedescribed method 500 may be performed each time a firmware update image 322 is to be installed on one or more storage units 306 on an IHS 200. Nevertheless, when use of the topology aware firmware update method 500 is no longer needed or desired, the process ends.

Although FIGS. 4 and 5 describes example methods 400 and 500 that may be performed to update the storage units 306 in an IHS 200 based upon their interface types, the features of the disclosed processes may be embodied in other specific forms without deviating from the spirit and scope of the present disclosure. For example, certain steps of the disclosed methods 400 and 500 may be performed sequentially, or alternatively, they may be performed concurrently. As another example, the methods 400 and 500 may perform additional, fewer, or different operations than those operations as described in the present example. As yet another example, the steps of the processes described herein may be performed by a system other than the RAC 230, such as by a cloud service existing in the cloud network that communicates remotely with the IHS 200. As yet another example, although the firmware update method 500 appears to show that the selected storage units 306 are updated sequentially, it should be appreciated that some, most, or all of the selected storage units 306 may be updated with new firmware simultaneously, at the same time.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a plurality of storage units;
at least one processor; and
at least one memory coupled to the at least one processor, the at least one memory having program instructions stored thereon that, upon execution by the at least one processor, cause the at least one processor to:
receive a firmware update image associated with the storage units; and
for each of the storage units:
identify a type of interface associated with at least a make and model of the storage unit based on information about the storage unit obtained from tables maintained by a Unified Extensible Firmware Interface (UEFI) boot process, and select an update profile based on the identified type of interface, wherein the interface is configured to provide communication between the storage unit and the IHS, and wherein the selected update profile comprises information associated with a predetermined sequence and type of operations that are to be performed for updating the storage unit; and perform a firmware update on the storage unit using the predetermined sequence and type of operations according to the selected update profile.

2. The IHS of claim 1, wherein the instructions, upon execution, cause the IHS to:

generate and store a storage inventory that includes information about the storage unit and the type of interface used by the storage unit; and access the storage inventory to determine the type of interface.

3. The IHS of claim 2, wherein the instructions, upon execution, cause the IHS to obtain the information about the storage unit using a Basic Input/Output System (BIOS) discovery process.

4. The IHS of claim 2, wherein the instructions, upon execution, cause the IHS to obtain the information about the storage unit when the storage unit is hot-plugged into the booted IHS.

5. The IHS of claim 2, wherein the instructions, upon execution, cause the IHS to:

store information associated with whether the storage unit supports a rebootless update; and when the storage unit does not support the rebootless update, receive user input to schedule the firmware update to be performed at a future time.

6. The IHS of claim 5, wherein the instructions, upon execution, cause the IHS to, when the storage unit does not support the rebootless update, determine whether read/write traffic on the storage unit is less than a predetermined maximum threshold read/write traffic percentage; and, in response to a determination that read/write traffic on the storage unit is less than the predetermined maximum threshold read/write traffic percentage, automatically trigger a reset of the storage unit to activate the storage unit with updated firmware.

7. The IHS of claim 1, wherein the interface comprises at least one of a Central Processing Unit (CPU) attached NVMe Solid State Drive (SSD) interface, a Boot Optimized Storage Solution (BOSS) interface, a Non-Volatile Memory Host Controller Interface Specification Express (NVMe) interface, a Power Edge RAID Controller (PERC) interface, a Host Bus Adapter (HBA) interface, a Just a Bunch of Disks (JBOD) interface, and an NVMe SSDs over Fabric (NVMeOF) interface.

8. The IHS of claim 1, wherein the instructions are executed by a Remote Access Controller (RAC) configured in the IHS.

9. A topology-aware firmware update method comprising:

receiving a firmware update image associated with a plurality of storage units; and for each of the storage units:

identifying a type of interface associated with at least a make and model of the storage unit based on information about the storage unit obtained from tables maintained by a Unified Extensible Firmware Interface (UEFI) boot process, and selecting an update profile based on the identified type of interface, wherein the interface is configured to provide communication between the storage unit and an Information Handling System (IHS), and wherein the selected update profile comprises information associated with a predetermined sequence and type of operations that are to be performed for updating the storage unit; and performing a firmware update on the storage unit using the predetermined sequence and type of operations according to the selected update profile.

10. The topology-aware firmware update method of claim 9, further comprising:

generating and storing a storage inventory that includes information about the storage unit and the type of interface used by the storage unit; and accessing the storage inventory to determine the type of interface.

11. The topology-aware firmware update method of claim 10, further comprising obtaining the information about the storage unit using a Basic Input/Output System (BIOS) discovery process.

12. The topology-aware firmware update method of claim 10, further comprising obtaining the information about the storage unit when the storage unit is hot-plugged into the IHS.

13. The topology-aware firmware update method of claim 10, further comprising:

storing information associated with whether the storage unit supports a rebootless update; and when the storage unit does not support the rebootless update, receiving user input to schedule the firmware update to be performed at a future time.

14. The topology-aware firmware update method of claim 13, further comprising, when the storage unit does not support the rebootless update, determining whether read/write traffic on the storage unit is less than a predetermined maximum threshold read/write traffic percentage; and, in response to determining read/write traffic on the storage unit is less than the predetermined maximum threshold read/write traffic percentage, automatically triggering a reset of the storage unit to activate the storage unit with the updated firmware.

15. The topology-aware firmware update method of claim 9, further comprising executing the firmware update out-of-band by a Remote Access Controller (RAC) configured in the IHS, when any IHS host processor is powered off.

16. A memory storage device having program instructions stored thereon that, upon execution by one or more processors of a client Information Handling System (IHS), cause the client IHS to:

receive a firmware update image associated with a plurality of storage units; and for each of the storage units:

identify a type of interface associated with at least a make and model of the storage unit based on information about the storage unit obtained from tables maintained by a Unified Extensible Firmware Interface (UEFI) boot process, and select an update profile based on the identified type of interface, wherein the interface is configured to provide communication between the storage unit and the IHS, and wherein the selected update profile comprises information associated with a predetermined sequence and type of operations that are to be performed for updating the storage unit; and perform a firmware update on the storage unit using the predetermined sequence and type of operations according to the selected update profile.

17. The memory storage device of claim 16, wherein the instructions, upon execution, cause the IHS to:

generate and store a storage inventory that includes information about the storage unit and the type of interface used by the storage unit; and access the storage inventory to determine the type of interface.

18. The memory storage device of claim 17, wherein the instructions, upon execution, cause the IHS to:
   store information associated with whether the storage unit supports a rebootless update; and
   when the storage unit does not support the rebootless update, receive user input to schedule the firmware update to be performed at a future time.

19. The memory storage device of claim 18, wherein the instructions, upon execution, cause the IHS to, when the storage unit does not support the rebootless update, determine whether read/write traffic on the storage unit is less than a predetermined maximum threshold read/write traffic percentage; and, in response to a determination that read/write traffic on the storage unit is less than the predetermined maximum threshold read/write traffic percentage, automatically trigger a reset of the storage unit to activate the storage unit with the updated firmware.

20. The memory storage device of claim 16, wherein the instructions are executed by a Remote Access Controller (RAC) configured in the IHS.

\* \* \* \* \*